No. 707,310. Patented Aug. 19, 1902.
J. C. FISHER.
BICYCLE LOCK.
(Application filed Apr. 5, 1902.)
(No Model.)
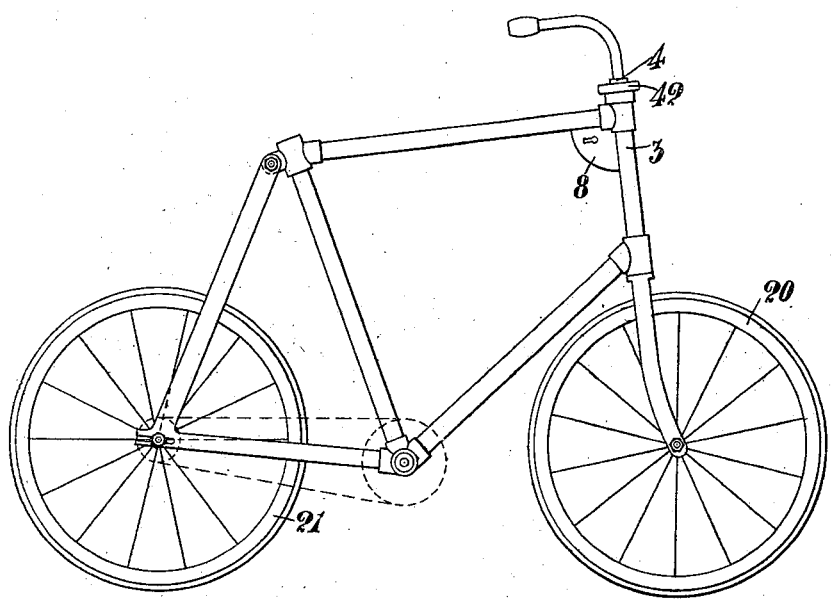
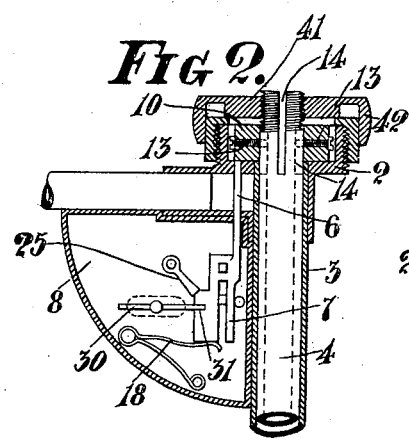
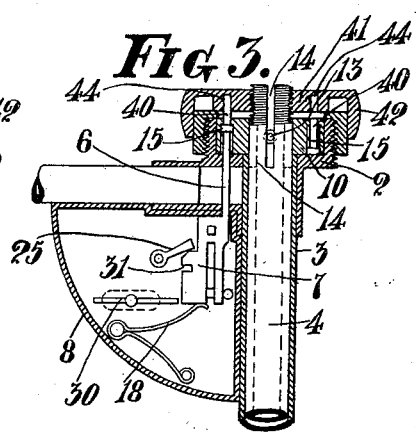
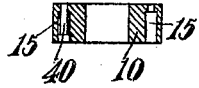
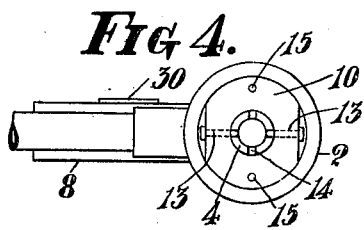
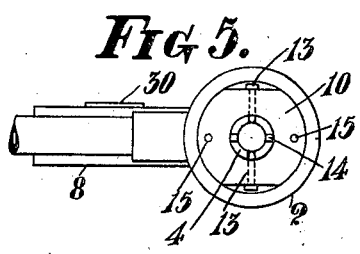
WITNESSES:
INVENTOR
Joyce Charles Fisher
BY
ATTORNEYS.

UNITED STATES PATENT OFFICE.

JOYCE CHARLES FISHER, OF MUSSOORIE, INDIA.

BICYCLE-LOCK.

SPECIFICATION forming part of Letters Patent No. 707,310, dated August 19, 1902.

Application filed April 5, 1902. Serial No. 101,577. (No model.)

*To all whom it may concern:*

Be it known that I, JOYCE CHARLES FISHER, a subject of the King of England, residing at Mussoorie, North-West Province, India, have invented certain new and useful Improvements in Bicycle-Locks, of which the following is a specification.

This invention relates to improvements in the means or method of locking the steering-head of safety-bicycles and other cycles, particularly adapted for locking the steering-wheel approximately at right angles to the other wheel or wheels.

To fully describe my invention, reference is made to the accompanying sheet of drawings, forming a part of this specification, in which similar reference-numerals indicate corresponding parts in each of the figures.

Figure 1 represents an elevation of a safety-bicycle fitted with my improvements. Fig. 2 is a sectional elevation, on a larger scale, of the steering-head and the locking attachment. Fig. 3 is a similar view with the head turned around at right angles and locked in that position. Figs. 4 and 5 are plan views of Figs. 2 and 3 without the cap, hereinafter referred to; Figs. 6 and 7, detail views hereinafter referred to.

The disk 2 is rigidly secured to the top of the socket 3, in which the steering-post 4 works. This disk is sufficiently large to allow the end 6 of a lock-bolt 7 to pass through. Above the disk 2 the disk 10 is secured to the steering-post 4 in such a way that it is compelled to turn with a post, but can be readily removed, if required. This may be effected by the radial screws 13 in the disk engaging the slits 14 in the top of the steering-post. Two holes 15 are made through the disk 10 diametrically opposite each other in a line parallel to the axis of the steering-head. These holes are the same distance from the center of the post as the bolt 7, and the bolt is a spring-bolt actuated by the spring 18. Therefore when the steering-wheel 20 is turned at right angles to the rear wheel 21 the bolt springs into one of the bolt-holes 15 and locks the wheel in one position. The bolt is preferably similar in principle to the bolt of an ordinary "lever-lock" and is fitted with any desired number of "levers." (Not shown.) The key 25, the barrel of which is shown in section in Figs. 2 and 3, is provided to unlock the bolt.

A sliding detent 30 is provided to engage the notch 31 in the bolt to hold it in the disengaged position when required.

The short studs 40 may be placed head downward in the holes 15, so that when the bolt 6 passes into either hole it lifts the stud therein and presses its top against the under side of the boss 41 of the cap 42, screwed on the top of the steering-post 4. A number of holes 44 are made in the boss 41, so that if any attempt is made to unscrew it to tamper with the parts the upwardly-pressed stud is forced into one of the holes in the boss of the cap and the latter is locked. Fig. 6 is a separate view of one of the studs, and Fig. 7 is a diametrical section of the disk 10 with a stud in one of the holes.

Having now particularly described and ascertained the nature of my said invention and in what manner the same is to be performed, I declare that what I claim is—

In a bicycle, the combination with the head or socket and the steering-post therein, of a transversely-arranged disk at the upper end of said socket, a second disk carried by the post adjacent to said first-named disk, and a locking-bolt slidingly supported, said bolt passing through an opening in the first disk and engaging a recess in the second disk, substantially as described.

In witness whereof I have hereunto set my hand in presence of two witnesses.

JOYCE CHARLES FISHER.

Witnesses:
JNO. BANKS,
H. STRANGEFELLOW.